US005615011A

United States Patent [19]
Boisrobert et al.

[11] Patent Number: 5,615,011
[45] Date of Patent: Mar. 25, 1997

[54] INTERFEROMETRIC SYSTEM FOR THE DETECTION AND LOCATION OF REFLECTOR FAULTS OF LIGHT-GUIDING STRUCTURES

[75] Inventors: Christian Boisrobert, La Carte; Michel Dontenwille, Lannion; Loïc Corne, Langueux, all of France

[73] Assignee: France Telecom, Paris, France

[21] Appl. No.: 393,713

[22] Filed: Feb. 24, 1995

[30]    Foreign Application Priority Data

Feb. 25, 1994 [FR]    France .................................. 94 02179

[51] Int. Cl.⁶ ...................................................... G01B 9/02
[52] U.S. Cl. ............................................ 356/345; 356/73.1
[58] Field of Search ................................. 356/345, 358, 356/356, 73.1

[56]             References Cited

U.S. PATENT DOCUMENTS

| 5,247,342 | 9/1993 | Tamura et al. | 356/358 |
| 5,270,790 | 12/1993 | Matsumura | 356/356 |
| 5,365,335 | 11/1994 | Sorin | 356/345 |

FOREIGN PATENT DOCUMENTS

| 2694088 | 1/1994 | France . |
| 02015685 | 1/1990 | Japan . |
| 02140640 | 5/1990 | Japan . |
| 9402823 | 2/1994 | WIPO . |

OTHER PUBLICATIONS

Journal of the Optical Society of America, vol. 7, No. 5, May 1990, NY, USA, pp. 857–867, K. Takada et al., "Interferometric Optical–Time–Domain Reflectometer To Determine Backscattering Characterization of Silica–Based Glass Waveguides".

Hewlett–Packard Journal, vol. 44, No. 1, Feb. 1993, Palo Alto, CA, pp. 39–48, H. Booster et al., "Design of a Precision Optical Low–Coherence Reflectometer".

SPIE Conference, Orlando, Florida, Apr. 1–5, 1991, 1474–1440, Masaru Kobayashi et al, "High–Spatial–Resolution and High–Sensitivity Interferometric Optical–Time–Domain Reflectometer".

Electronics Letters, vol. 21, No. 18, Aug. 1985, Enage GB, pp. 781–783, M. Tsubokawa et al., "Chromatic Deispersion Measurement of a SM Fibre by Optical Heterodyne Interferometry".

*Primary Examiner*—Frank Gonzalez
*Assistant Examiner*—Robert Kim
*Attorney, Agent, or Firm*—Pearne, Gordon, McCoy & Granger

[57]             ABSTRACT

Interferometric system for the detection and location of reflector faults of light-guiding structures.

This system has a first interferometer comprising an incoherent light source (4), an optical coupler (6) connected to the source and to the structure (2), means (18a, 18b) for the displacement of a support (16) in translation at constant speed, a reflector (24) fixed to the support, photodetection means (26) supplying during a translation of the support an interferogram for a reflector fault of the structure, pulse generating means (28 to 48) and means (50) which sample the interferogram by pulses, which store the samples obtained and locate the reflector faults.

4 Claims, 4 Drawing Sheets

INTERFEROMETRIC SYSTEM FOR THE DETECTION AND LOCATION OF REFLECTOR FAULTS OF LIGHT-GUIDING STRUCTURES

DESCRIPTION

The present invention relates to an interferometric system for the detection and location of reflector faults of light-guiding structures.

The term "light-guiding structures" is understood to mean optical waveguides such as e.g. optical fibres, optical couplers and even laser emitters.

The present invention more particularly applies to the field of optical telecommunications and permits the location of weakly reflecting diopters in such optical guides with a high resolution.

The invention also makes it possible to measure transmission characteristics of such optical guides, as well as the reflection coefficients of passive or active guiding structures.

An interferometric system for the detection and location of reflector faults is already known from the following document:

(1) High-spatial-resolution and high-sensitivity interferometric optical-time-domain reflectometer, Masaru Kogayashi, Juichi Noda, Kazumasa Takada and Henry F. Taylor, SPIE Conference, Orlando, Fla. Apr. 1–5, 1991, pp. 1474–40.

This known system simply uses the form of the interferograms which it makes it possible to obtain in order to locate the faults.

The present invention solves the problem of obtaining an interferometric system able to define the position of propagation "accidents" (reflector faults) distributed along the optical guides, with a greater precision than with that obtained with the system known from document (1).

For this purpose, the present invention uses an interferometer of the Michelson type in incoherent light, as well as means for sampling interferograms obtained with said interferometer.

Another interferometric system for the detection and location of reflector faults is known from the following document:

(2) FR-A-2 694 088 (cf. also WO 94/02823 published on Feb. 3, 1994).

However, said other known system is a complex system, requiring three supports displaceable in translation.

The present invention is directed at a much simpler system than said other known system.

More specifically, the present invention relates to an interferometric system for the detection and location of reflector faults of a light-guiding structure, said system comprising a first interferometer having:

an incoherent light source, an optical coupler with four branches, whereof a first branch is optically coupled to the incoherent light source and whereof a second branch is optically coupled to the light-guiding structure, a support, means for the displacement of the support in translation in a given direction and at a constant speed, a first light reflector, which is fixed to the support and is able to reflect, parallel to the translation direction of the support, a light beam parallel to said direction, first optical means for receiving the light from a third branch of the coupler and for supplying said light to the first reflector in the translation direction of the support, first light detection means optically coupled to a fourth branch of the coupler and able to supply at the output, during a translation of the support, a first interferogram in electrical form, for each reflector fault which the light-guiding structure is liable to have, the system being characterized in that it also incorporates:

means for generating first periodic electric pulses and electronic processing means receiving at the input said first pulses and the first interferogram in electrical form and able to sample said first interferogram by first pulses, store the thus obtained samples and locate the reflector faults of the light-guiding structure by means of stored samples.

The first optical means can comprise an off axis parabolic mirror, whose focus coincides with the end of the third branch of the coupler and which is able to reflect the light from said third branch parallel to the translation direction of the support.

The interest of using such a mirror is that the reflection on said mirror, which is a polished, reflecting surface, is achromatic, the position of the images formed by said mirror and the corresponding optical paths being independent of the wavelength of the rays.

This mirror is not an optically dispersive element and does not affect the optical spectrum of the chosen light source. The more extensive the optical spectrum of said source, the better the spatial resolution of the system.

Moreover, the alignments and optical settings are performed more easily and rapidly when use is made of a source emitting visible rays and when the optical elements to be aligned have properties independent of the wavelengths of said rays (which is the case with the mirror).

According to a first embodiment of the system according to the invention, the means for generating the first pulses incorporate a second interferometer and shaping means, the second interferometer having:

a monomode laser source, light beam splitting means for receiving a light beam from said laser source and for transmitting a first part and reflecting a second part of said beam, a second light reflector for reflecting said first part to the splitting means, which form therefrom a first light beam, second optical means fixed to the support and third optical means positioned facing said support and which cooperate with the second optical means in order to receive and reflect, in accordance with a given optical path, the said second part towards the splitting means, which form therefrom a second light beam and make the latter interfere with the first light beam, the given Optical path varying by the quantity N.$\Delta$x when the support is displaced in translation by a length $\Delta$x, N being a number whose product by the ratio of the central wavelength of the incoherent light source to the wavelength of the laser source exceeds 4 and second light detection means positioned facing the splitting means and which detect the first and second light beams, which interfere with one another and supply at the output, in electrical form, a second interferogram during a translation of the support, and in that the shaping means supply said first pulses from said second interferogram, each first pulse corresponding to a period of said second interferogram.

Preferably, the second optical means comprise first and second cube wedges, the third optical means comprise a third cube wedge and a third light reflector arranged in such a way that said second part of the beam, which is reflected by the splitting means, follows a path along which it is successively reflected by the first cube wedge, the third cube wedge, the second cube wedge and the third light reflector and then follows the reverse path, the number N thus being equal to 8 and the central wavelength of the incoherent source is at least equal to double the wavelength of the laser source.

According to a second embodiment, the system according to the invention also has:

- a rule provided with scale marks and positioned facing the support, parallel to the translation direction of said support,
- means for reading said scale marks, which are fixed to the support and supply second periodic pulses respectively corresponding to the scale marks, during a translation of the support and
- means for controlling the support displacement means in such a way that the frequency of the second pulses is a submultiple of the frequency of the first pulses. The control means can incorporate:
- frequency dividing means receiving at the input the first pulses and supplying at the output pulses, whose frequency is the submultiple of the frequency of the first pulses and
- comparison means, whereof one input is connected to the output of the frequency dividing means, whereof another input is connected to the output of the scale mark reading means and whereof the output controls the displacement means of the support.

The invention is described in greater detail hereinafter relative to non-limitative embodiments and the attached drawings, wherein show.

Figure 1:
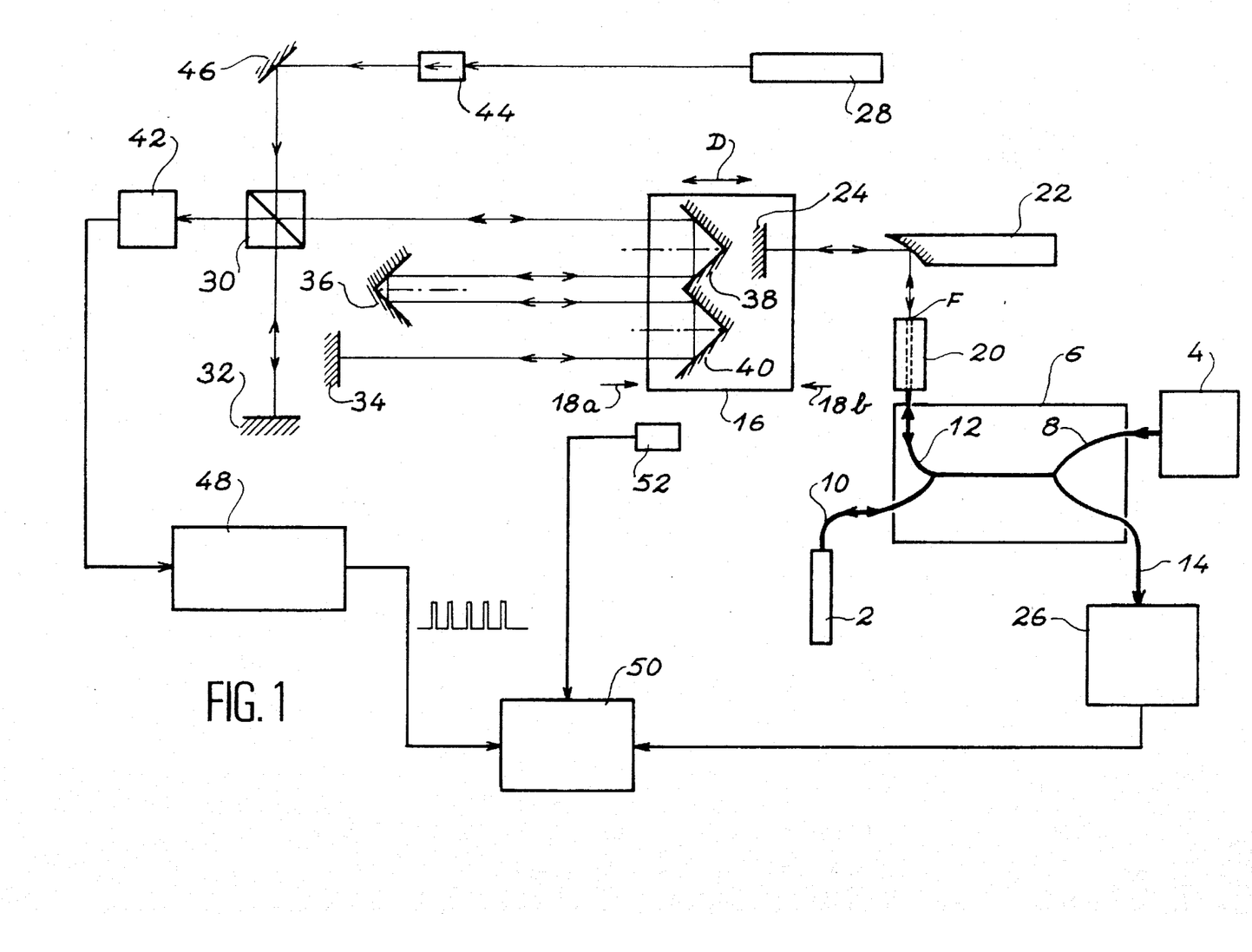
FIG. 1 A diagrammatic view of an embodiment of the system according to the invention.

The interferometric system according to the invention diagrammatically shown in FIG. 1 is used for detecting and locating one or more reflector faults liable to occur in an optical waveguide 2.

This system has an interferometer comprising an incoherent light source 4 able to emit a beam, whose optical spectrum is wide and has a substantially Gaussian envelope, the central wavelength of said optical spectrum being designated $\lambda 0$.

Use is e.g. made of a superluminescent diode able to emit an infrared beam in the wavelength range from 1.2 to 1.6 μm, so that $\lambda 0$ is 1.4 μm.

This interferometer also has a type 2×2 optical coupler 6 with monomode optical fibres and whereof the four branches respectively carry the references 8, 10, 12 and 14.

The interferometer also has a support 16 displaceable in translation parallel to a given direction D and means for displacing the support 16 in one direction and also in the opposite direction, parallel to the direction D.

These means are e.g. members 18a and 18b, which give pulses of the opposite direction to the support 16, which is mounted on an air cushion, said support consequently having a substantially constant speed movement on most of its path.

Each of the branches 10 and 12 of the coupler 6 receives half the radiation from the source 4, which is optically coupled to the branch 8 of the coupler 6. The branch 10 of the coupler 6 is optically coupled to the optical waveguide 2. The end of the optical fibre constituting the branch 12 is polished perpendicular to its axis, which is perpendicular to the direction D. This end of the fibre 12 is fitted in a ferrule 20.

The interferometer of FIG. 1 also has an off axis parabolic reflector 22 at whose focus F is located the end of the fibre 12, the not shown axis of the parabola, whose mirror 22 adopts the shape, being parallel to the direction D.

The interferometer also incorporates a plane mirror 24, which is fixed to the support 16 and arranged perpendicular to the direction D facing the parabolic mirror 22.

The light beam from the source 4 and propagating in the fibre 12 of the coupler 6 passes out of the end of said fibre and is then collimated by the mirror 22 along an axis parallel to the direction D up to the mirror 24. The latter reflects the beam, which consequently again passes into the fibre 12 following the reverse path.

If the guide 2 has a reflector fault, the branch 14 of the coupler 6 receives the light beam reflected by said fault, as well as the light beam propagating in the branch 12 and coming from the mirror 24.

These two beams interfere with one another in the branch 14 of the coupler 6 and the resulting interferences are detected by the photodetection and amplification means 26 to which the branch 14 is optically coupled.

Thus, if there is a reflecting diopter in the guide 2, the means 26 convert into electrical signal form the light interferences resulting therefrom and amplify said signals.

Figure 2:
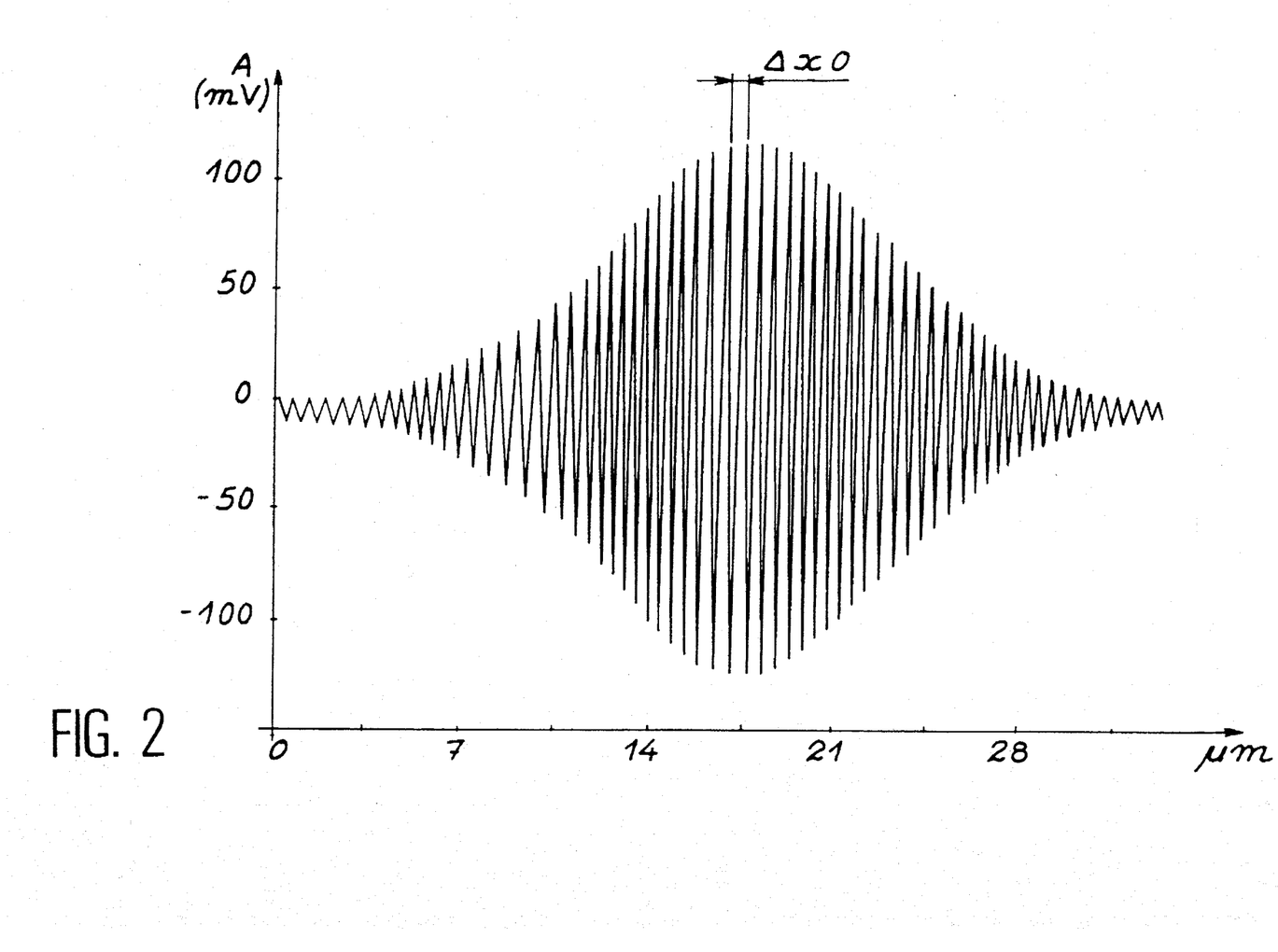
FIG. 2 An interferogram obtained as a result of the system of FIG. 1.

Under these conditions, by moving the support 16 in one or other direction parallel to the direction D, the photodetection and amplification means 26 supply, in electrical form, an interferogram, whose representation (using not shown display means) corresponds to FIG. 2.

If the guide 2 has a plurality of reflecting diopters, obviously several successive interferograms are obtained.

The form and amplitude of each interferogram are dependent on the spectral characteristics of the light source 4, optical characteristics of the reflecting diopter corresponding thereto and the displacement speed of the mirror 24, i.e. the displacement speed of the support 16.

The interferogram of FIG. 2 is plotted in a coordinate system, whose ordinate axis corresponds to reflection amplitudes A (in mV) and whose abscissa axis corresponds to a distance covered by the support 16 (in microns).

The interferometer of the system of FIG. 1 constitutes a Michelson interferometer in which the coupler 6 replaces the beam splitting plate which conventionally occurs in such an interferometer.

The maximum amplitude of the interferogram of FIG. 2 corresponds to the equality between the optical length of the arm of the interferometer, which is terminated by the mirror 24 and the optical length of the arm of the interferometer, which is terminated by the reflecting diopter of the guide 2.

As a result of the substantially Gaussian shape of the optical spectrum of the radiation source 4, said interferogram also has a substantially Gaussian envelope, which "amplitude-modulates" a sinusoidal signal. The spatial period of said sinusoidal signal is designated $\Delta x0$. This spatial period is the minimum distance by which must be displaced the mirror 24 and therefore the support 16 to obtain, on the part of the means 26, two substantially identical levels in the signal. According to the operating principle of a Michelson interferometer, said spatial period is $\lambda 0/2$.

Such an interferometer has another property. The half-width of the Gaussian envelope of the interferogram is smaller and contains less sinusoid periods the larger the half-width of the envelope of the optical spectrum of the source 4.

The displacement of the support 16 at constant speed V makes it possible to detect, with the minimum noise, the sinusoid of the interferogram, whose frequency FO (carrier frequency of the interferograms) is $1/\Delta x0$ and know the precise position of a reflecting diopter along the axis of the examined guide.

It is pointed out that the half-width of the envelope of said carrying sinusoid makes it possible to determine the spatial resolution of the system, i.e. the power of spatially separating two adjacent reflecting diopters of the guide 2.

In order to improve the sensitivity and resolution results without a regulation of the translation speed of the support 16 being necessary, the system of FIG. 1 incorporates interference fringe counting means. These means consist of another Michelson interferometer, which has a monomode laser source 28, whose wavelength is designated $\lambda 1$. This source 28 is e.g. a frequency-stabilized, helium-neon laser, whose wavelength $\lambda 1$ is 0.6328 μm.

Said other interferometer also has a splitting mixing cube 30, two plain mirrors 32, 34, three "cube wedge"-type reflectors 36, 38 and 40, as well as photodetection and amplification means 42 able to supply an electrical signal when they receive a light and amplify said electrical signal.

As can be seen in FIG. 1, the mirrors 32, 34 and the cube wedge 36 are fixed, (like the mirror 22), whereas the cube wedges 38 and 40 are fixed to the support 16 and are consequently mobile in translation in the direction D.

Said other interferometer also successively has, following the laser 28, an optical isolator 44, which prevents any passage of light in the direction of the laser 28 and a plane mirror 46 forming an angle of 45° with the direction D.

The beam splitting plate of the cube 30, which faces the plane mirror 46, forms an angle of 90° with the latter. The plane mirror 32 is parallel to the direction D and is opposite to the mirror 46 with respect to the cube 30. The mirror 34 is perpendicular to the direction D, whilst the axes of the cube wedges 36, 38 and 40 are parallel to said direction D.

As can be seen in FIG. 1, the reflector sides of the cube wedges 38, 40 are turned towards the reflector side of the cube wedge 36 (and towards the splitting-mixing cube 30), whereas the plane mirror 34 is oriented in the opposite direction with respect to said cube 30.

The light emitted by the laser 28 traverses the optical isolator 44 and is then reflected on the plane mirror 46 and reaches the splitting-mixing cube 30, which splits it into two light beams. One of these beams is supplied in the direction of the plane mirror 32, is reflected on the latter and returns to the cube 30, which reflects it towards the photodetection and amplification means 42. The other beam is supplied to the cube wedge 38 and is successively reflected on the latter, on the cube wedge 36, on the cube wedge 40 and on the plane mirror 34.

As from the latter, said other beam returns to the cube 30 being successively reflected on the cube wedge 40, the cube wedge 36 and the cube wedge 38. The cube 30 then supplies said other beam to the photodetection and amplification means 42. Thus, said means 42 detect the light interferences of the two aforementioned beams.

The relative arrangements of the cube wedges 36, 38 and 40 and the plane mirror 34 are such that, when the support 16 is displaced by a length $\Delta x$ parallel to the direction D, the length of the optical path of the light beam successively reflected by the cube wedge 38, the cube wedge 36, the cube wedge 40 and the plane mirror 34 and vice versa varies by 8 times $\Delta x$.

During a displacement of the support 16, the means 42 which detect the aforementioned interferences, supply in the form of an electrical signal an interferogram, whose spatial period $\Delta x1$ is $\lambda 1/8$.

The length of this interferogram or its time duration is considerable in view of the nature of the light source used.

According to the invention comparison takes place between the signal supplied by the means 26 and the signal supplied by the means 42, when said means 26 detect the presence of a reflecting diopter in the guide 2 and when the support 16 is displaced by $\Delta x0$.

The means 26 then supply an interferogram period whilst the means 42 supply an interferogram having a number P of periods $\Delta x1$ such that:

$$P=\Delta x0/\Delta x1=4.\lambda 0/\lambda 1.$$

Consequently, if $\lambda 0$ is at least equal to $2\lambda 1$, which is the case in the embodiment described, P is at least equal to 8.

More generally, using a sufficient number of cube wedges, it is possible to obtain for the optical path referred to hereinbefore, a variation of $N.\Delta x$ when the support 16 is displaced by $\Delta x$. In this case, the period of the interferogram supplied by the means 42 is equal to $\lambda 1/N$ and the number P is equal to $(N/2).\lambda 0/\lambda 1$. Thus, it is possible to obtain an even larger number P than hereinbefore.

With a view to the sampling referred to hereinafter and to satisfy the Shannon theorem, it is appropriate for P to exceed 2 (preferably being well above 2), i.e. $N.\lambda 0/\lambda 1$ exceeds 4.

Returning to the example where N is 4 and P is consequently at least 8, FIG. 1 shows that the system also has shaping means 48, whose input is connected to the output of the means 42, as well as electronic processing means 50 receiving at the input the output signals of the means 48 and the output signals of the means 26.

Figure 3A:
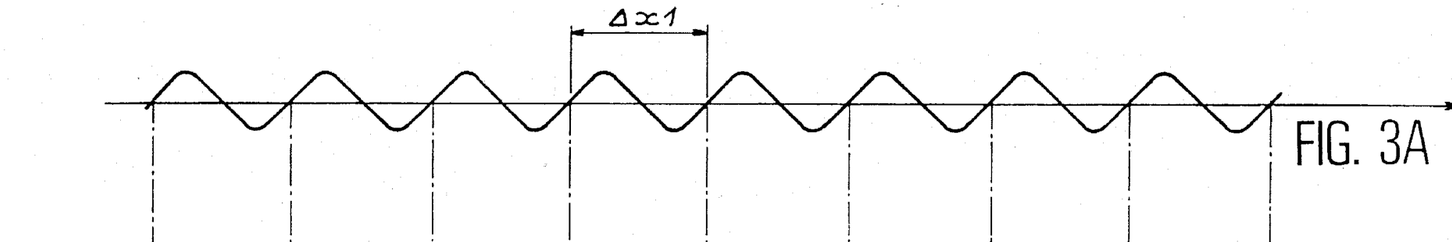
FIG. 3A An interferogram permitting the sampling of the interferogram of FIG. 2.

The means 48 shape the signals supplied by the means 42. When the support 16 is displaced in one direction, the means 42 supply in electrical form an interferogram forming a quasi-sinusoid of spatial period $\Delta x1$ (taking account of the nature of the source 28), as can be seen in FIG. 3A.

Figure 3B:
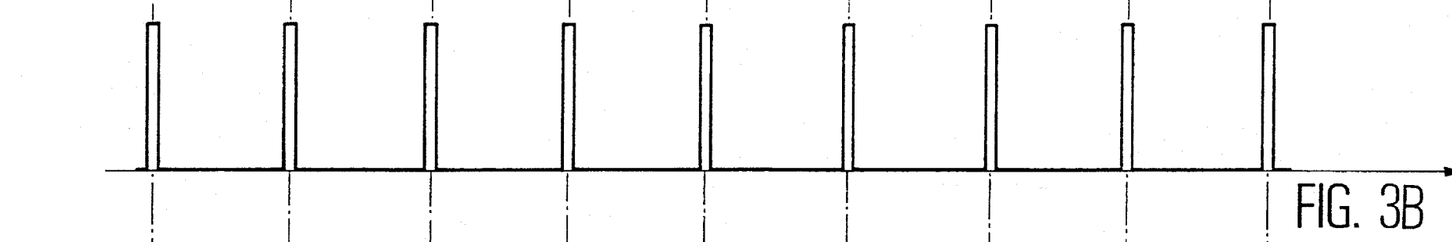
FIG. 3B shows pulses resulting from the interferogram of FIG. 3A.

On the basis of this quasi-sinusoid, the means 48 supply a periodic sequence of brief electric pulses synchronized on the 0 passage times of said quasi-sinusoid (FIG. 3B).

Figure 3C:
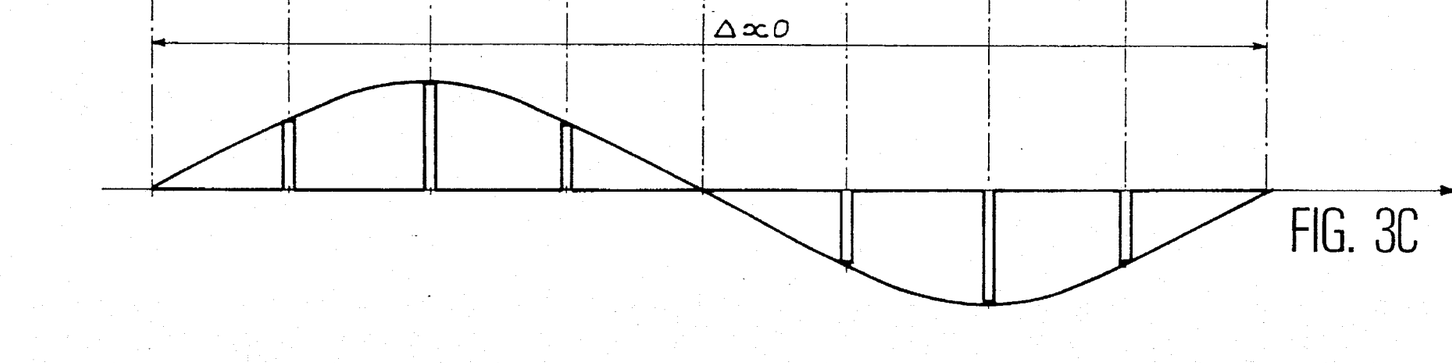
FIG. 3C shows the sampling of the interferogram of FIG. 2 by the pulses of FIG. 3B.

The means 50 sample, at a rate of eight samples per period $\Delta x0$, the interferograms supplied in electrical form by the means 26 with the aid of said brief pulses (FIG. 3C).

These means also incorporate random access memories or RAMs for storing the thus obtained samples. Thus, there is no need to stabilize the displacement speed of the support 16.

It is merely necessary to define the starting position of said support 16 (said position constituting a starting "pip" for the counting of the interference fringes of the interferometer having the coupler 6) with an excellent resolution. For this purpose use is made of a position sensor 52 having a high resolution and good mechanical stability, which supplies the starting pip to the means 50.

In the electronic processing means 50, use is made of conventional digital signal processing methods for detecting the presence of a reflecting diopter, said detection being possible even if the reflection coefficient of said diopter is low, the corresponding interferogram then being immersed in a background noise, more particularly due to the photodetection and amplification means.

The means 50 also determine the position of the diopter by means of stored samples and analyze the phase of the sinusoid carrying the interferogram.

The signal supplied by the detection and amplification means 26 is exploited entirely on the basis of the Shannon theorem (a sufficient number of samples per period $\Delta x0$ is chosen in order to have all information relative to said sinusoid) and the Fourier transform.

Obviously, the means 50 are provided with not shown display means on the basis of which system users obtain the sought results.

The system according to FIG. 1 has very good performance characteristics with respect to the very accurate definition of the positions of the support 16, as a result of the fact that the visible light interference fringe counting system uses as the reference a secondary length standard (laser source 28). However, it is sometimes impossible to exploit such a system for electronic and mechanical environmental reasons. To obviate this disadvantage, another system according to the invention has been designed, which is diagrammatically and partly shown in FIG. 4.

Figure 4:
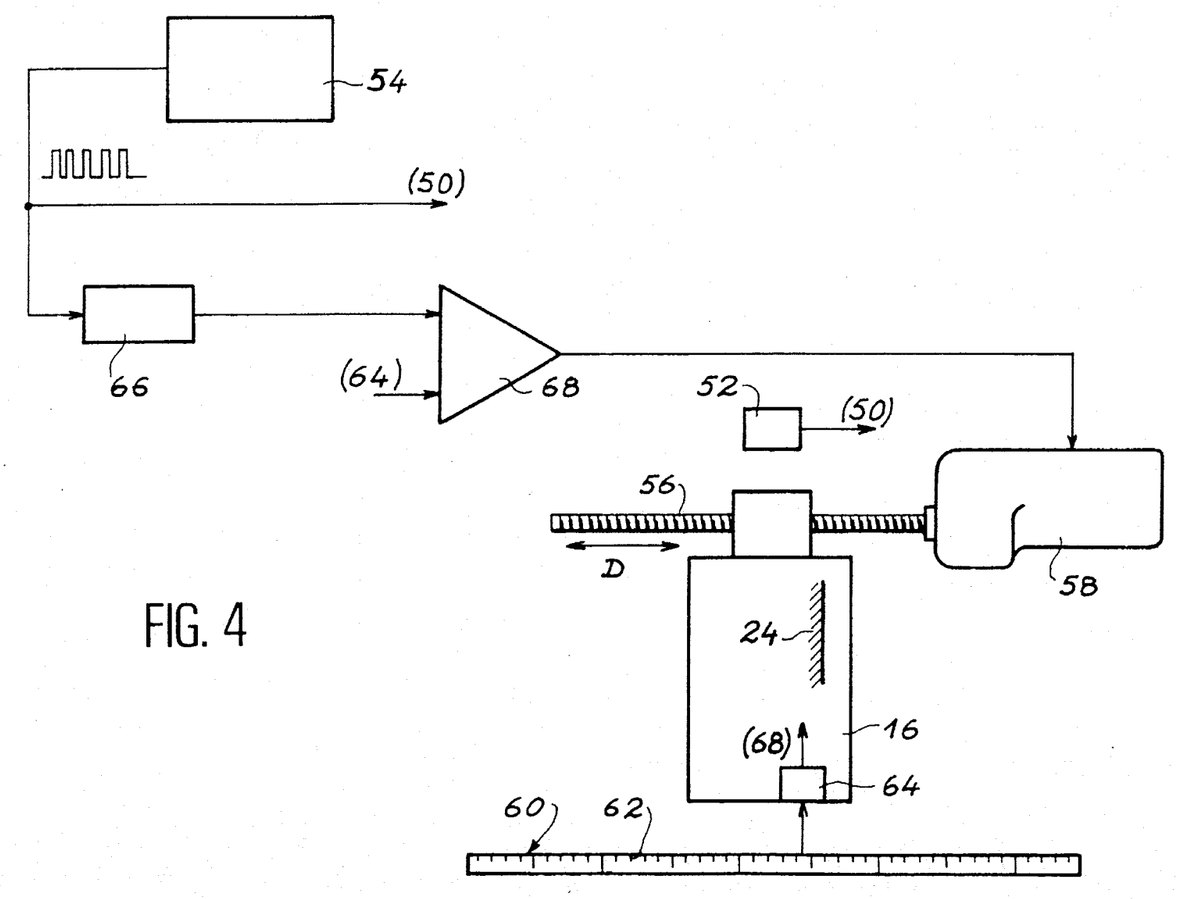
FIG. 4 A partial, diagrammatic view of another embodiment of the system according to the invention.

The system of FIG. 4 incorporates the source 4, the coupler 6, the mirrors 22, 24, the means 26, 50 and the sensor 52 of FIG. 1, as well as the support 16 carrying the mirror 24. However, in the system of FIG. 4, the elements of the system of FIG. 1 carrying the references 28 to 40 are eliminated.

These elements are replaced by a sampling pulse generator 54, whose frequency is designated Fg and which are supplied to the input of the means 50 in the same way as the pulses supplied by the means 48 in FIG. 1.

Moreover, in the case of FIG. 4, the support 16 is displaced in translation parallel to the direction D by a helical screw drive 56 controlled by an electric motor 58.

A fixed rule 60 parallel to the direction D and on which are formed fine scale marks 62 is positioned facing the support 16.

In a way known in the field of numerically controlled machine tools, an optical sensor 64 joined to the support 16 reads the scale marks, whose spacing $\Delta x1$ is e.g. 0.5 μm. Thus, when the support moves by $\Delta x1$, the sensor 64 supplies a pulse-type electrical signal (or in the form of a sinusoid arch).

Due to the fact that this spacing $\Delta x1$ of 0.5 μm is of the same order of magnitude as the central wavelength $\Delta\lambda0$ of the source 4, the frequency F1 of the pulses emitted by the optical sensor 64, which is equal to $V/\Delta x1$ in which V represents the speed of the source 16, would be too low to permit a storage of the interferograms with a sufficient number of samples.

For this reason in the system of FIG. 4, the rotation speed of the motor 58 is controlled in such a way that the frequency F1, which is also the reading frequency of the scale marks of the rule 60, is a submultiple Fg/M of the frequency Fg, which is e.g. 2 MHz.

To do this, the system of FIG. 4 has means 66 for dividing the frequency Fg receiving at the input the pulses supplied by the generator 54 and supplying at the output pulses of frequency Fg/M, in which M is e.g. 10.

The system of FIG. 4 also incorporates a comparator 68, whereof one input is connected to the output of the means 66 and whereof the other input is connected to the output of the optical sensor 64. The motor 58 is controlled by the output of the comparator 68.

To each sampling pulse of the generator 54 corresponds a position of the support 16 (it is considered that the displacement speed V remains constant between two pulses corresponding to two adjacent scale marks of the rule 60). Thus, there is an improvement by a factor M of the precision on the position of the support 16 and consequently the mirror 24.

Reference is made hereinafter to the use of the systems of FIGS. 1 and 4. The support 16 provided on each of these systems is mobile in translation along an axis between two extreme positions. During its displacement between the two ends of its path, said support 16 passes in the vicinity of the fixed, high resolution, position sensor 52.

This sensor serves as a reference on the basis of which is defined the position of the support 66 by counting fringes detected by means 42, in the case of the system of FIG. 1, or by counting pulses supplied by the generator 54, in the case of the system of FIG. 4, with a high precision and high reproducibility because the position of the sensor 52 is fixed with respect to the mirror 34 and the cube wedge 36 in the case of the system of FIG. 1 and with respect to the ends of the rule 60, in the case of the system of FIG. 4.

When the guide 2, which is coupled to the branch or "test arm" 10 of the coupler has a reflector fault located at an optical distance L from the centre of the coupler 6 and when the mirror 24 passes through a position such that its optical distance from the centre of the coupler 6 is equal to L, the photodetection means 26 supply a signal, called an "interferogram", like that shown in FIG. 2, as a function of the position of the mirror 24 along the translation axis of the support 16.

The amplitude and shape of said interferogram are functions of the displacement speed and the fibres used, but also the spectral properties of the source 4 and those of the reflecting centre located along the guide 2. The means for counting the fringes or pulses and for processing the signal applied on the basis of these fringes or pulses by sampling to the interferogram of FIG. 2, make it possible to detect the existence of reflecting centres, to know their positions in accurate form, as well as the spectral properties (reflection coefficient, chromatic dispersion, etc.) during the displacement of the support 16).

We claim:

1. Interferometric system for the detection and location of reflector faults of a light-guiding structure (2), said system comprising a first interferometer having:

an incoherent light source (4), an optical coupler (6) with four branches, whereof a first branch (8) is optically coupled to the incoherent light source and whereof a second branch (10) is optically coupled to the light-guiding structure, a support (16), means (18a, 18b, 58) for the displacement of the support in translation in a given direction (D) and at a constant speed, a first light reflector (24), which is fixed to the support and is able to reflect, parallel to the translation direction of the support, a light beam parallel to said direction, first optical means (22) for receiving the light from a third branch (12) of the coupler (6) and for supplying said light to the first reflector (24) in the translation direction of the support, first light detection means (26) optically coupled to a fourth branch (14) of the coupler and able to supply at the output, during a translation of the support, a first interferogram in electrical form, for each reflector fault which the light-guiding structure (2) is liable to have, the system further comprising:

means (28 to 48, 54) for generating first periodic electric pulses, said generating means including a second interferometer and shaping means, and electronic processing means (50) receiving at the input said first pulses and the first interferogram in electrical form and able to sample said first interferogram by first pulses, store the thus obtained samples and locate the reflector faults of the light-guiding structure (2) by means of said stored samples, wherein the second interferometer comprises:

a monomode laser source (28), light beam splitting means (30) for receiving a light beam from said laser source and for transmitting a first part and reflecting a second part of said beam, a second light reflector (32) for reflecting said first part to the splitting means, which form therefrom a first light beam, second optical means (38, 40) fixed to the support (16) and third optical means (34, 36) positioned facing said support (16) and which cooperate with the second optical means in order to receive and reflect, in accordance with a given optical path, the said second part towards the splitting means, which form therefrom a second light beam and make the latter interfere with the first light beam, the given optical path varying by the quantity $N.\Delta x$ when the support is displaced in translation by a length $\Delta x$, N being a number whose product by the ratio of the central wavelength of the incoherent light source to the wavelength of the laser source exceeds 4 and second light detection means (42) positioned facing the splitting means (30) and which detect the first and second light beams, which interfere with one another and supply at the output, in electrical form, a second interferogram during a translation of the support, wherein said second optical means comprise first (38) and second (40) cube wedges, and the third optical means comprise a third cube wedge (36) and a third light reflector (34) arranged in such a way that said second part of the beam, which is reflected by the splitting means, follows a path along which it is successively reflected by the first cube wedge (38), the third cube wedge (36), the second cube wedge (40) and the third light reflector (34) and then follows the reverse path, the number N thus being equal to 8 and the central wavelength of the incoherent source is at least equal to double the wavelength of the laser source (28)

and wherein the shading means (48) supply said first pulses from said second interferometer, each first pulse corresponding to a period of said second interferogram.

2. System according to claim 1, wherein the first optical means comprise an off axis parabolic mirror (22), whose focus (F) coincides with the end of the third branch (12) of the coupler (6) and which is able to reflect the light from said third branch parallel to the translation direction of the support.

3. System according to claim 1, further comprising:

a rule (60) provided with scale marks (62) and positioned facing the support (16), parallel to the translation direction of said support, means (64) for reading said scale marks, which are fixed to the support (16) and supply second periodic pulses respectively corresponding to the scale marks, during a translation of the support and means (66, 68) for controlling the support displacement means (58) in such a way that the frequency of the second pulses is a submultiple of the frequency of the first pulses.

4. System according to claim 3, wherein the control means comprise:

frequency dividing means (66) receiving at the input the first pulses and supplying at the output pulses, whose frequency is the submultiple of the frequency of the first pulses and comparison means (68), whereof one input is connected to the output of the frequency dividing means (66), whereof another input is connected to the output of the scale mark reading means (64) and whereof the output controls the displacement means (58) of the support.

* * * * *

UNITED STATES PATENT AND TRADEMARK OFFICE
CERTIFICATE OF CORRECTION

PATENT NO. : 5,615,011
DATED : March 25, 1997
INVENTOR(S) : Boisrobert Et Al.

It is certified that error appears in the above-indentified patent and that said Letters Patent is hereby corrected as shown below:

On the Face of the Patent, under Other Publications, the third reference should read as follows --SPIE Conference, Orlando, Florida, Apr. 1-5, 1991, 1474-40, Masaru Kobayashi et al, "High-Spatial-Resolution and High-Sensitivity Interferometric Optical-Time-Domain Reflectometer".--.

Column 2, line 54, delete "Optical" and insert --optical--.

Column 2, line 55, delete "N.$\Delta$x" and insert --N•$\Delta$x--.

Column 5, line 30, delete "splitting mixing" and insert --splitting-mixing--.

Column 6, line 13, delete "$\lambda$x1" and insert --$\Delta$x1--.

Column 6, line 30, delete "N.$\Delta$x" and insert --N•$\Delta$x--.

Column 6, line 33, delete "(N/2).$\lambda$0/$\lambda$1." and insert --(N/2)•$\lambda$0/$\lambda$1.--.

Column 6, line 37, delete "N.$\lambda$0/$\lambda$1" and insert --N•$\lambda$0/$\lambda$1--.

UNITED STATES PATENT AND TRADEMARK OFFICE
CERTIFICATE OF CORRECTION

PATENT NO. : 5,615,011
DATED : March 25, 1997
INVENTOR(S) : Boisrobert Et Al.

It is certified that error appears in the above-indentified patent and that said Letters Patent is hereby corrected as shown below:

Column 9, line 30, delete "N.Δx" and insert --N•Δx--.

Column 10, line 9, delete "shading" and insert --shaping--.

Signed and Sealed this

Thirtieth Day of September, 1997

*Attest:*

BRUCE LEHMAN

*Attesting Officer*     *Commissioner of Patents and Trademarks*